(12) United States Patent
Eguchi (10) Patent No.: US 6,422,972 B1
(45) Date of Patent: Jul. 23, 2002

(54) ENGINE CONTROL APPARATUS (75) Inventor: Takahiro Eguchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 31 days.

(21) Appl. No.: 09/629,979

(22) Filed: Jul. 31, 2000

(30) Foreign Application Priority Data

Aug. 2, 1999 (JP) ............................................ 11-219360

(51) Int. Cl.$^7$ .............................................. B60K 41/14
(52) U.S. Cl. ...................................... 477/107; 477/111
(58) Field of Search ................................ 477/107, 110, 477/37, 175, 111

(56) References Cited

U.S. PATENT DOCUMENTS 4,769,774 A * 9/1988 Narita et al.
5,991,682 A * 11/1999 Ishizu ......................... 701/84
6,102,831 A * 8/2000 Wakahara et al. .......... 477/169

FOREIGN PATENT DOCUMENTS

| JP | 9-71138 | 3/1997 |
| JP | 9-209790 | 8/1997 |

* cited by examiner

Primary Examiner—Sherry Estremsky (57) ABSTRACT

An engine control apparatus waits to stop the engine of a hybrid vehicle until the vehicle is in a condition to be able to start moving properly. An engine control apparatus for a vehicle, having a continuously variable transmission, coupled to an engine which generates a drive force, for driving wheels, so that, when the vehicle is in a stop-event, to enable stopping or restarting of operation of the engine in response to specific driving conditions, comprising: a fuel supply cut device for stopping operation of the engine while continuing to cut supply of fuel to the engine, when the vehicle is in a deceleration event; a vehicle velocity detector for detecting a traveling velocity of the vehicle; and a deceleration detector for detecting deceleration of the vehicle, wherein the fuel supply cut device reverts from a fuel supply cut condition when a traveling velocity of the vehicle detected by the vehicle velocity detector is lower than a predetermined velocity and a deceleration detected by the deceleration detector is higher than a predetermined deceleration.

2 Claims, 9 Drawing Sheets

ENGINE CONTROL APPARATUS

BACKGROUND OF THE INVENTION

1. Field of the Invention

The present invention relates to an engine control apparatus for a vehicle, and more particularly relates in particular to an engine control apparatus for stopping the engine and cutting a fuel supply to a vehicle equipped with an automatic transmission.

This application is based on Japanese Patent Application No. Hei 11-219360, the contents of which are incorporated herein by reference.

2. Description of the Related Art

Conventionally, hybrid vehicles are well-known that carry a separate motor in addition to a drive engine as a power source. Hybrid vehicles are divided into a series hybrid vehicle in which the engine drives a generator that outputs electric power to operate the motor to drive the wheels, and a parallel hybrid vehicle in which a motor connected to the engine is used to assist the rotation of the drive shaft of the engine as well as to charge of electrical energy to an electricity storage apparatus using the same motor or a separate generator.

Such hybrid vehicles are advantageous compared with the vehicles equipped with conventional engines because they enable to operate the engine in a range of roughly constant rotational speed where fuel consumption and exhaust emissions are low, or they are able to reduce operating load on the engine.

Also, in some of the hybrid vehicles, the operation of the engine may be stopped under certain operating conditions as disclosed in a Japanese Unexamined Patent Application, First Publication, Hei 8-317505.

In such a hybrid vehicle capable of stopping the engine under certain operating conditions, there are advantages because overcharging of the battery can be avoided or fuel consumption is further lowered by stopping the engine; however, this technology can sometimes lead to the following problems.

That is, if the engine is stopped while the automatic transmission, including the continuously variable transmission (CVT), is not in a ready-to-move condition, the automatic transmission, which is operated by the oil pressure generated by power output by the engine, is unable to function when the engine is stopped. When the vehicle is to start moving again, because the transmission is engaged in a reduction ratio that existed when engine-stop was executed, acceleration is slow and the time interval required for the starting clutch to fully engage is increased so that the fuel consumption is increased.

Also, when the vehicle is ready to move, there are problems such that oil pressure required to return to a move-enabling reduction ratio is robbed, resulting in inadequate lubrication of the starting clutch or slipping of the drive belt as a result of insufficient lateral pressure on the pulley.

SUMMARY OF THE INVENTION

It is therefore an object of the present invention to provide an apparatus for controlling an engine for a vehicle so that the apparatus provides a waiting period so that the engine is ready to start moving before the engine is stopped.

The first aspect of the present invention, an engine control apparatus for a vehicle, having a continuously variable transmission (CVT 3, for example), coupled to an engine (engine 1, for example) which generates a drive force, for driving wheels (drive wheel W, for example), so that, when the vehicle is in a stop-event, to enable stopping or restarting of operation of the engine in response to specific driving conditions, comprising: a fuel supply cut device (step S320, for example) for stopping operation of the engine while continuing to cut supply of fuel to the engine, when the vehicle is in a deceleration event; a vehicle velocity detector (vehicle velocity sensor 4S, for example) for detecting a traveling velocity of the vehicle; and a deceleration detector (a device for computing acceleration based on the change in output data from the vehicle velocity sensor 4S) for detecting deceleration of the vehicle, wherein the fuel supply cut device reverts from a fuel supply cut condition when the traveling velocity of the vehicle detected by the vehicle velocity detector is lower than a predetermined velocity and a deceleration detected by the deceleration detector is higher than a predetermined deceleration (according to determinations in steps S65 and S66, for example).

According to the first aspect of the present invention, because a vehicle velocity detector and a deceleration detector are provided and the fuel supply cut device is designed to revert from the fuel supply cut condition according to vehicle velocity and deceleration, it is possible to return the reduction ratio of the continuously variable transmission to the restart enabling reduction ratio before engine-stop is executed.

The second aspect of the present invention, an engine control apparatus for a vehicle, having a continuously variable transmission (CVT 3, for example), coupled to an engine (engine 1, for example) which generates a drive force, for driving wheels (drive wheel W, for example), so that, when the vehicle is in a stop-event, to enable stopping or restarting of operation of the engine in response to specific driving conditions, comprising: a fuel supply cut device (step S320, for example) for stopping operation of the engine while continuing to cut supply of fuel to the engine, when the vehicle is in a deceleration event; a vehicle velocity detector (vehicle velocity sensor 4S, for example) for detecting a traveling velocity of the vehicle; and a reduction ratio detector (a device for computing a ratio of output of engine speed sensor 1S and output of output shaft rotation sensor 3S) for detecting reduction ratio of the continuously variable transmission, wherein the fuel supply cut device reverts from a fuel supply cut condition only during an interval in which a reduction ratio detected by the reduction ratio detector is lower than a reduction ratio predetermined in accordance with a traveling velocity detected by the vehicle velocity detector (according to determinations in steps S67 and S68, for example).

According to the second aspect of the present invention, because a vehicle velocity detector and a reduction ratio detector are provided and the fuel supply cut device is designed to revert from the fuel supply cut condition according to vehicle velocity and reduction ratio, it is possible to return the reduction ratio of the continuously variable transmission to the restart enabling reduction ratio before engine-stop is executed.

DESCRIPTION OF THE PREFERRED EMBODIMENTS

A preferred embodiment of the engine control apparatus for a hybrid vehicle will be presented in the following with reference to the drawings.

Figure 1:
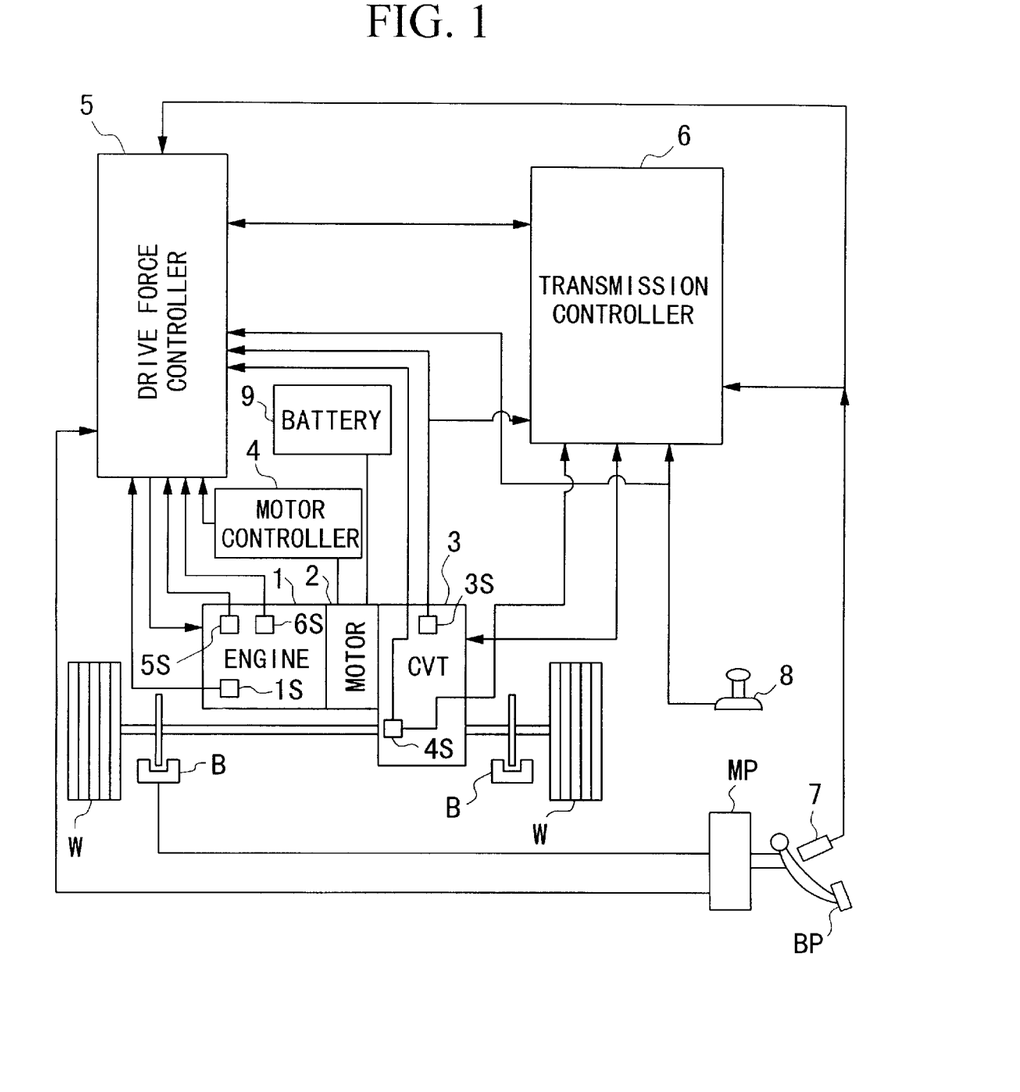
FIG. 1 is a block diagram of an embodiment of the hybrid vehicle in the present invention.

FIG. 1 shows a block diagram of the structure of the embodiment. In this diagram, a reference numeral 1 relates to an internal combustion engine, which will be referred to as the engine hereinbelow, and it is shown as "engine" in the drawings. A reference numeral 2 relates to an electric motor, and will be referred to as the motor hereinbelow, and it is shown as "motor" in the drawings. The motor 2 is used to assist the output power of the engine, depending on the operating condition of the vehicle, and is used to regeneration during the deceleration stage of the vehicle. Reference numeral 3 relates to a transmission mechanism comprised by a belt-driven continuously variable transmission (CVT) and a torque converter type automatic transmission, for example, and includes a clutch or a torque converter, forward/reverse switching mechanism, gearshift mechanism and differential gears.

In the following presentation, it is assumed that the transmission is a CVT type, and is designated as CVT 3 and is shown in the diagrams as "CVT". Other reference numerals are as follows: motor controller 4 for controlling the rotation of the motor 2; drive force controller 5 for controlling the rotation of the motor 2 through engine 1 and motor controller 4; transmission controller 6 for controlling CVT 3; brake switch 7 for detecting whether or not the brake pedal BP is being depressed, and outputting a signal to indicate whether brake B is on or off to the transmission controller 6 and to the drive force controller 5.

The reference numeral 8 relates to a position switch for determining the (gear) shift range. The position switch 8 has, at least, P-range for parking; R-range of reversing; N-range for neutral; and D-range for driving; and outputs a signal to identify each shift position to the transmission controller 6 and the drive force controller 5. A battery 9 supplies electrical drive power to the motor 2, and is charged by the electrical power obtained from the regenerative state of the motor 2. An engine speed sensor 1S detects the engine speed of the engine 1 and outputs the results. An output shaft rotation sensor 3S detects the rotational speed of the rotation shaft coupled to the driven pulley of CVT 3. The output shaft rotation sensor 3S is used to compute the reduction ratio of CVT 3 according to the results output from the engine speed sensor 1S and the output shaft rotation sensor 3S. The reduction ratio represents a ratio of the input revolutions and output revolutions, and is expressed as: reduction ratio=a number of input revolutions/a number of output revolutions. A vehicle velocity sensor 4S obtains the velocity of the vehicle from the rotational speed of the drive shaft for the drive wheel W, and outputs the results. The output of the vehicle velocity sensor 4S is used to obtain the vehicle velocity in the drive force controller 5 and in the transmission controller 6, and is also used to obtain acceleration from the changes in the vehicle velocity. Reference numeral 5S relates to a water temperature sensor for detecting and outputting the water temperature of the cooling water for the engine 1, and the numeral 6S relates to the throttle opening sensor for detecting and outputting the degree of opening (e.g., extent of opening) of the throttle of the engine 1.

Figure 10:
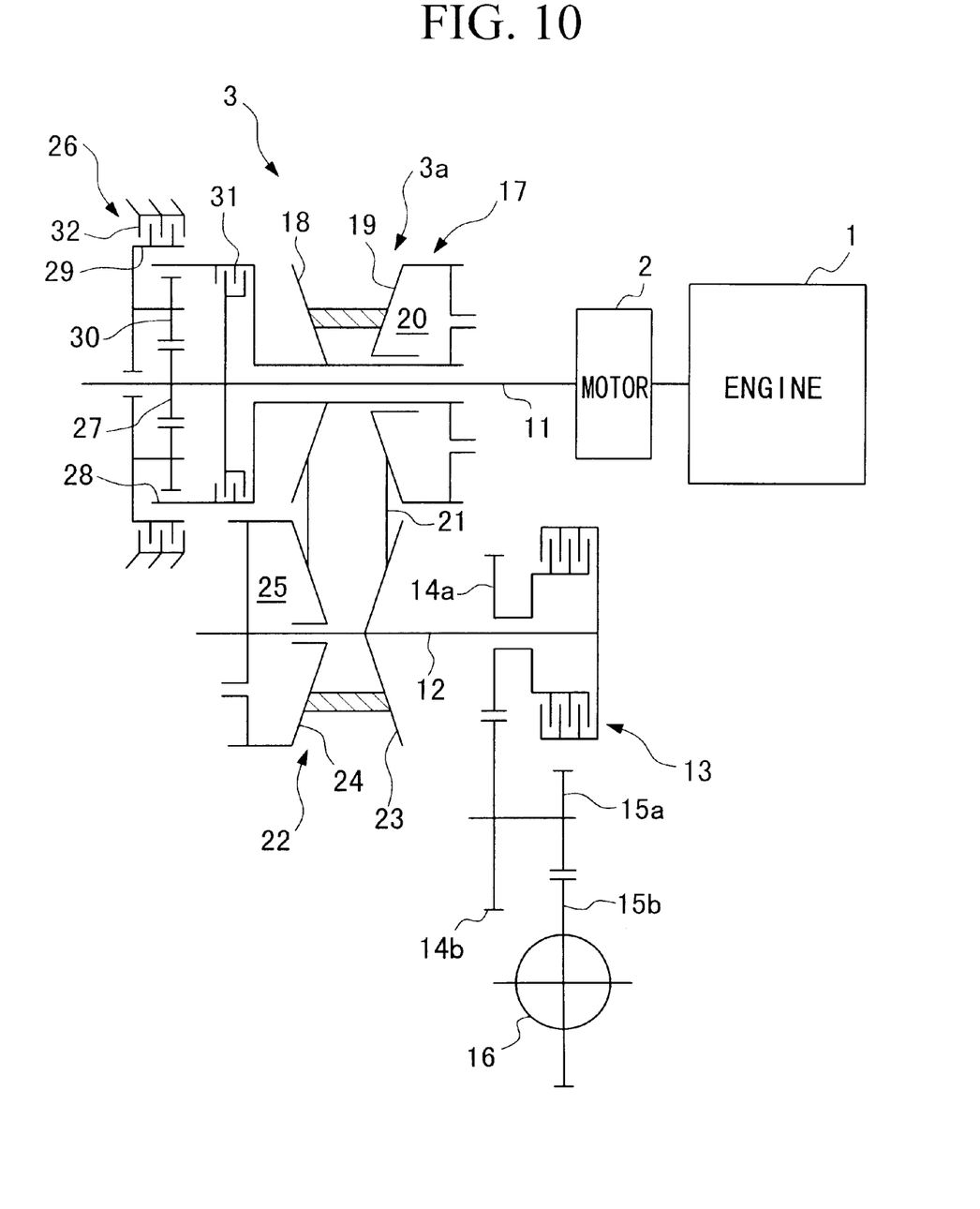
FIG. 10 is a schematic diagram to show the structure of CVT 3.

The structure of CVT 3 shown in FIG. 1 will be explained with reference to FIG. 10. FIG. 10 is a schematic diagram of CVT 3. In this diagram, reference numeral 11 relates to the input shaft which is connected directly to engine 1 and motor 2; reference numeral 12 relates to a counter shaft and the rotation of input shaft 11 is transmitted thereto by the belt-driven CVT 3a. The reduction ratio referred to above is a ratio of the number of revolutions of the input shaft 12 (referred to as input revolution number) and the number of revolutions of the counter shaft 12 (referred to as output revolution number). Reference numeral 13 relates to the start clutch for transmitting or decoupling the transmission of rotation of the counter shaft 12 to the drive wheel W. Reference numerals 14a, 14b, 15a, 15b relate to drive power transmission gears, and reference numeral 16 relates to differential gears.

Reference numeral 17 relates to a drive pulley comprised by drive-side fixed pulley 18; drive-side movable pulley 19; and drive-side cylinder chamber 20; and reference numeral 21 is a V-belt; and reference numeral 22 relates to a driven pulley comprised by driven-side fixed pulley 23; driven-side movable pulley 24; and driven-side cylinder chamber 25: and reference numeral 26 relates to a forward or reverse switching mechanism comprised by switches for sun-gear 27; ring gear 28; carrier 29; pinion gear 30; forward clutch 31 and reverse brake 32.

Next, the operation of CVT 3 will be explained briefly with reference to FIG. 10. First, rotation of the input shaft 11 connected directly to the engine 1 and the motor 2 causes the drive pulley 17 to rotate. The direction of rotation of the drive pulley 17 is determined by the location of shift indicated by the position switch 8. In other words, if it is in the D-range, the forward clutch 31 is ON and, simultaneously, the reverse brake 32 is OFF, and the drive pulley 17 rotates in the forward direction. On the other hand, if it is in the R-range, the forward clutch 31 is OFF and, simultaneously, the reverse brake 32 is ON, and the drive pulley 17 rotates in the reverse direction.

The rotation motion of the drive pulley 17 is transmitted to the driven pulley 22 by V-belt 21. Further, the rotation motion of the driven pulley 22 is transmitted to the start clutch 13 by the counter shaft 12. Thus, by the ON/OFF action of the start clutch 13, the drive wheel W rotates in the forward or reverse direction.

The reduction ratio of CVT 3 is changed by the action of the hydraulic oil flowing into the drive-side cylinder chamber 20 and the driven-side cylinder chamber 25 to let the drive-side movable pulley 19 and the driven-side movable pulley 24 to respectively slide over the input shaft 11 and the counter shaft 12 to vary the pulley ratio.

Accordingly, because the start clutch 13 in CVT 3 shown in FIG. 1 is provided on the driven-side, it is possible to change the reduction ratio of the belt-driven CVT 3a, even when the vehicle is stopped so long as the engine 1 is operating.

Figure 9:
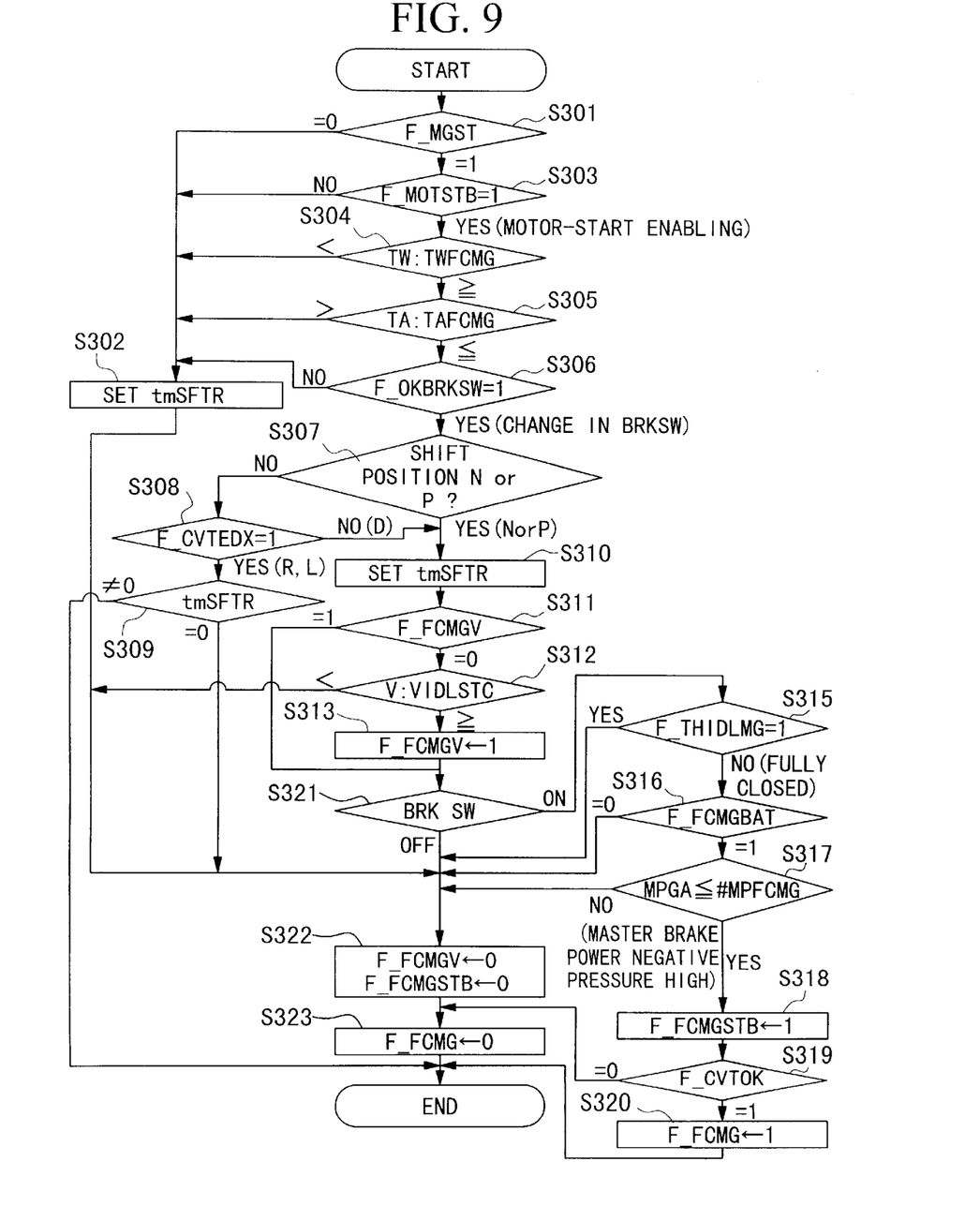
FIG. 9 is a flowchart for the process of engine-stop execution determination by the drive force controller 5.

Next, engine-stop/restart operation performed by the drive force controller 5 will be explained briefly with reference to FIG. 9. FIG. 9 shows a flowchart to show the process for performing engine-stop execution determination using the drive force controller 5.

First, the condition of the start-switch-ON start execution flag F_MGST is determined in step S301. If the start-switch-ON start execution flag F_MGST is set to "0", i.e., it is the first start, the shift range stability waiting timer tmSFTR is set in step S302. And, the determination flag F_FCMGV, to indicate that the vehicle has exceeded a specific speed value since the starter was operated, and the engine-stop preparation complete flag FCMGSTB for CVT 3 are both set to "0" in step S322, and, the engine-stop control execution flag F_FCMG is set to "0" in step S323, and the control process is finished.

On the other hand, in step S301, if the start-switch-ON start execution flag F_MGST is "1", i.e., it is not the first start, it is determined in step S303 whether the communication information (referred to as corn information) F_MOTSTB from the motor controller 4 is "1". When the corn information F_MOTSTB is "1", the vehicle is in a condition to allow the motor 2 to perform engine-start while if it is "0", the vehicle is not in a condition to allow the motor 2 to perform engine-start.

If, in step S303, it is determined that the corn information F_MOTSTB from the motor controller 4 is "1", then in the next step S304, water temperature TW is compared against the lower limit water temperature TWFCMG for engine-stop.

If it is determined that the water temperature TW is less than the lower limit water temperature TWFCMG for engine-stop, the flow proceeds to step S302. This procedure ensures that the engine will not be stopped unless the engine is in perfect warming-up condition. Thus, if it is determined that the water temperature TW is at or above the lower limit water temperature TWFCMG for engine-stop, then, in step S305, intake air temperature TA is compared against the upper limit intake air temperature TAFCMG for engine-stop.

If it is determined that the intake air temperature TA is higher than the upper limit intake air temperature TAFCMG for engine-stop, the flow proceeds to step S302. This procedure ensures that the engine will not be stopped when the intake air temperature is excessive to prevent difficulty in starting the engine and to maintain air conditioning efficiency. Therefore, if it is determined that the intake air temperature TA is equal to or below the upper limit intake air temperature TAFCMG for engine-stop, the flow proceeds to step S306.

Next, in step S306, the condition of the brake switch OK flag F_OKBRKSW is determined. In this step S306, it is determined whether the brake switch 7 is operating normally, and when it is not abnormal the flag is set to "1". Thus, when it is determined that the brake switch 7 is normal, the flow proceeds to step S307, and when it is determined that the brake switch 7 is abnormal, the flag is set to "0", and the flow proceeds to step S302.

In step S307, it is determined whether the shift position of the position switch 8 is in the N (neutral)- or P (parking)- range or in another range.

When it is determined that the brake switch 7 is in a range other than N- or P-range, the condition of the drive range determination flag F_CVTEDX is determined in step S308. When the drive range determination flag F_CVTEDX is "0", it indicates that the switch is in the D-range, and when the value is "1", the switch is in the R-range.

Therefore, when it is determined that the drive range determination flag F_CVTEDX is "0" in step S308, the flow proceeds to step S310 to execute engine-stop, and when it is determined that the drive range determination flag F_CVTEDX is "1", the flow proceeds to step S309 and it is determined whether the shift range stability waiting timer tmSFTR is "0". When in step S309 it is determined that the shift range stability waiting timer tmSFTR is "0", the flow proceeds to step S322, and when it is determined that the shift range stability waiting timer tmSFTR is not "0", then the control process is finished.

The reason for providing the shift range stability waiting timer tmSFTR is to prevent the durations of engine-stop from decreasing, because the engine-stop condition is deactivated whenever gear passes through the R-range when shifting the gear between D-range and P-range.

In step S307, if it is determined that the shift range is N-range or P-range, engine-stop can be executed, and therefore, the shift range stability waiting timer tmSFTR is set in the next step S310.

Next, in step S311, the condition of the determination flag F_FCMGV is determined to find whether a vehicle velocity has exceeded a specific value after the starter was activated.

If it is determined that the determination flag F_FCMGV is "0" to indicate that the vehicle velocity has exceeded a specific value, the flow proceeds to step S312, and the vehicle velocity V is compared against the engine-stop execution determination vehicle velocity VIDLSTC at low vehicle velocities (for example, 15 km/h).

If it is determined, in step S312, that the vehicle velocity V is lower than the engine-stop execution determination vehicle velocity VIDLSTC at low vehicle velocities, the flow proceeds to step S322. And, if the vehicle velocity V is determined to be equal to or higher than the engine-stop execution determination vehicle velocity VIDLSTC at low vehicle velocities, "1" is set in the determination flag F_FCMGV, in step S313, to indicate that the vehicle velocity has exceeded the specific vehicle velocity after the vehicle restarts.

The flags initialized at the restart (in step S322) after the engine-stop event in the steps S311, S312 and S313 are not set to "1" until the vehicle velocity exceeds the engine-stop execution determination vehicle velocity VIDLSTC engine-stop execution determination vehicle velocity VIDLSTC at low vehicle velocities, so that, once the engine is restarted, the engine will not be stopped again until the specific vehicle velocity has been reached.

In other words, because there can be frequent stopping/ restarting events due to traffic congestion, temporary stop, or restart situations, once the engine has been restarted, it will not be stopped again until the vehicle has traveled some distance.

In step S321, the condition of the brake switch 7 is determined, and if it is determined that the brake switch 7 is "ON", the flow proceeds to step S315 to determine the condition of the throttle-fully-closed-state determination flag F_THIDLMG. If the throttle-fully-closed-state determination flag F_THIDLMG is "1", i.e., if it is determined that the throttle (not shown) is not fully closed, the flow proceeds to step S322, so that the engine is not stopped. If the throttle-fully-closed-state determination flag F_THIDLMG is "0", i.e., it is determined that the throttle is fully closed, the flow proceeds to step S316, and the condition of the restart determination flag F__FCMGBAT indicating the low remaining battery charge state in the battery (not shown) is determined.

If the restart determination flag F__FCMGBAT is set to "0" in step S316, indicating lowering of the remaining battery charge state i.e., it is determined that restart is necessary because of the low remaining battery charge state, the flow proceeds to step S322. On the other hand, if the restart determination flag F__FCMGBAT is "1", i.e., it is determined that restart because of low remaining battery charge state is not necessary, the flow proceeds to step S317.

In step S317, the absolute value of the master brake power negative pressure MPGA of the master brake power MP is compared against the absolute value of the engine-stop execution master brake power upper limit negative pressure #MPFCMG.

If the master brake power negative pressure MPGA is equal to or below the engine-stop execution master brake power upper limit negative pressure #MPFCMG, i.e., the result is "YES" in step S317, the flow proceeds to step S318 and the engine is stopped.

On the other hand, if the master brake power negative pressure MPGA is closer to atmospheric pressure than the engine-stop execution master brake power upper limit negative pressure #MPFCMG (i.e. the result is "NO" in step S317), the flow proceeds to step S322, and the engine is restarted.

Therefore, while the engine is stopped or it appears that the negative pressure of the master brake power MP is becoming unavailable by means of pumping the brake while the fuel supply is being cut, the engine 1 is restarted to secure the braking power or to revert from the fuel supply cut condition so as to secure master brake power negative pressure MPGA. The result is to lessen the burden on the driver caused by the lack of master brake power negative pressure MPGA.

Then, the engine-stop preparation complete flag F__FCMGSTB for CVT 3 is set to "1" in step S318, and the condition of the engine-stop OK flag F__CVTOK for CVT 3 is determined in step S319. If the engine-stop OK flag F__CVTOK for CVT 3 is "1", i.e., it is determined that the engine-stop preparation is ready, the engine-stop control execution flag F__FCMG is set to "1" in step S320, and the process is finished. If the engine-stop OK flag F__CVTOK for CVT 3 is "0", i.e., it is determined that the engine-stop preparation is not ready, the engine-stop control execution flag F__FCMG is set to "0" in step S323, and the process is finished.

When the condition of the brake switch is examined in step S321, and if it is determined that the brake switch is "OFF", "0" is set in both the determination flag F__FCMGV to indicate that the vehicle velocity has exceeded a specific value after the starter restarts and the engine-stop preparation complete flag F__$_F$CMGSTB for CVT 3 in step S322, and the engine-stop control execution flag F__FCMG is set to "0" in step S323, and the process is finished.

Accordingly, the engine 1 can be stopped or restarted in accordance with the specific condition of driving being encountered.

Next, the process of controlling the revolution of engine 1 and motor 2 according to the conditions of CVT 3 will be explained with reference to FIGS. 1 to 5.

As explained earlier, when the engine-stop preparation is readied, the drive force controller 5 set "1" in the engine-stop preparation complete flag F__FCMGSTB, and the transmission controller 6 is notified of this fact. Upon receiving this notice, the transmission controller 6 sets the engine-stop OK flag F__CVTOK according to the condition of CVT 3, and sends a parameter CVTOKNO including the engine-stop OK flag F__CVTOK to the drive force controller 5. By this action, the drive force controller 5 determines whether or not to perform engine-stop, and executes engine-stop.

Figure 2:
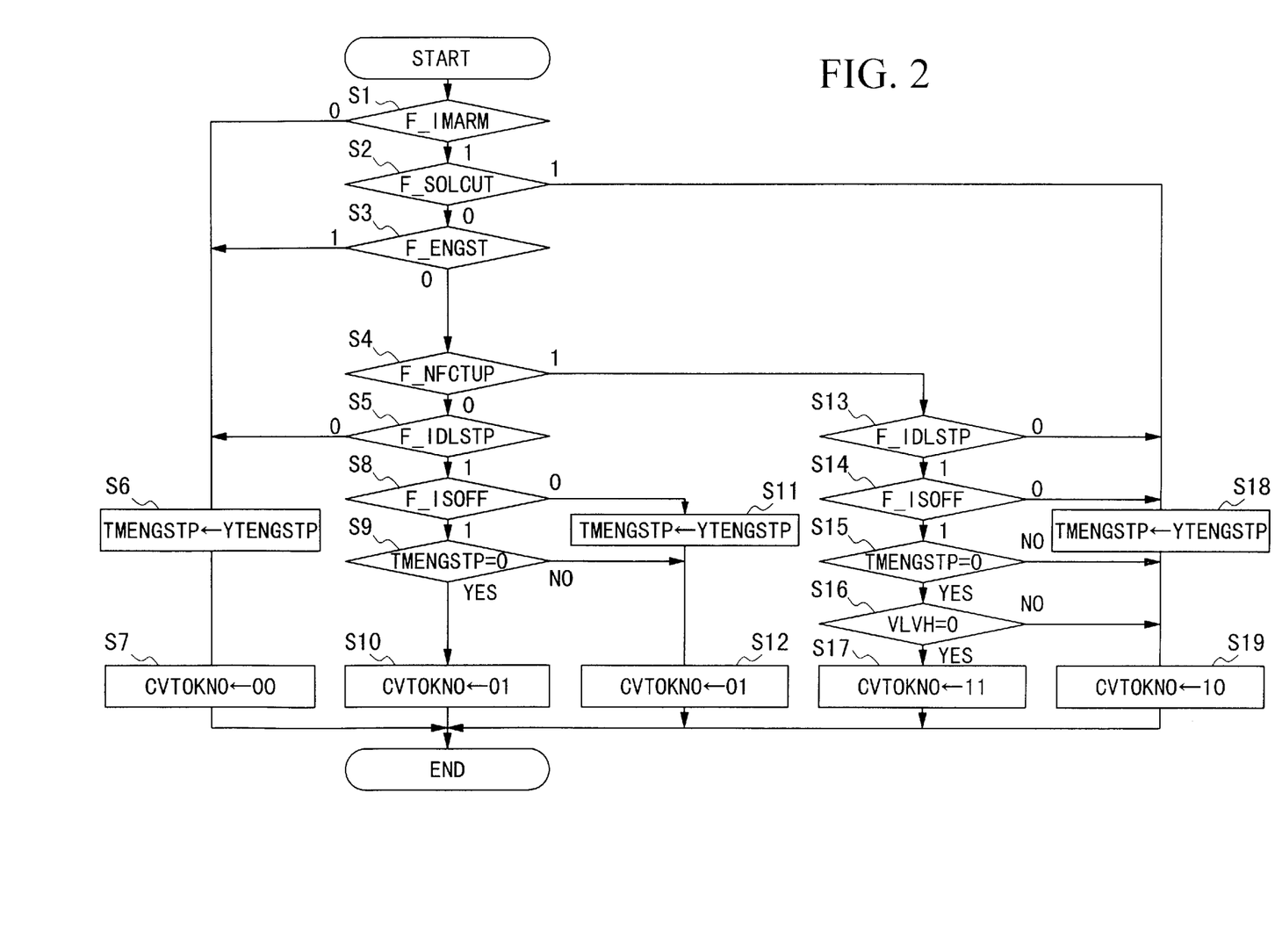
FIG. 2 is a flowchart to show the process of notifying the drive force controller 5 of the state of CVT 3 in the transmission controller 6 shown in FIG. 1.

Next, the process of setting the parameter CVTOKNO including the engine-stop OK flag F__CVTOK will be explained with reference to FIG. 2. FIG. 2 is a flowchart to show the process in which the transmission controller 6 sets a parameter CVTOKNO according to the conditions of CVT 3. The transmission controller 6 repeats the process of setting the parameter CVTOKNO, shown in FIG. 2, at constant regular intervals. The time interval for execution is determined by the transmission controller 6 according to the time duration necessary to detect the conditions of CVT 3, for example, and in this example, a value of 10 ms is given to the time interval.

The parameter CVTOKNO is a 2-bit parameter, and the upper bit of the 2-bit parameter represents whether or not to revert from the fuel supply cut condition, and if this upper bit is "1", the reverted rotational speed from the fuel supply cut condition during deceleration is set higher than the current number of revolutions being set. By so doing, when the fuel supply is being cut during deceleration of the vehicle, fuel supply cut condition is modified before the engine speed of engine 1, which is decreased in connection with the reduction of the vehicle velocity, becomes too low. On the other hand, if the upper bit is "0", the fuel supply cut condition is continued while maintaining the reverted rotational speed at a predetermined value. Reverting from the fuel supply cut condition means to resume fuel injection. Also, the lower bit of the 2-bit parameter means the same as the previous engine-stop OK flag F__CVTOK, and if it is "1", engine-stop is permitted, and if it is "0", engine-stop is not permitted.

First, in step S1, it is determined whether the transmission to be controlled is disposed on a hybrid vehicle by the hybrid vehicle determination flag F__IMARM. When the hybrid vehicle determination flag F__IMARM is set to "1", the vehicle is a hybrid vehicle, and other types of vehicles are preset to "0". By so doing, it is possible to prevent erroneous control by the drive force controller 5 on engines installed in vehicles other than the hybrid vehicle.

Next, in step S2, it is determined whether the control solenoid for CVT 3 failed according to the linear solenoid fail flag F__SOLCUT. When this flag is set to "1", it indicates that the solenoid has failed and "0" means that the solenoid has not failed. If the determination is a fail, the flow proceeds to step S18.

If the solenoid is operating and the engine is being stopped, it is determined in step S3 whether the engine is to be started according to the engine-start determination flag F__ENGST. The engine-start determination flag F__ENGST is set by the process to be described later, and when this flag is set to "1", the engine 1 is started and the flow proceeds to step S6.

When the engine-start determination flag F__ENGST is "0", it is determined in step S4 whether reversion from the fuel supply cut condition is demanded according to the fuel supply cut reversion flag __NFCTUP. The fuel supply cut reversion flag F__NFCTUP is a flag that is set or reset by the process to be described later, and if this flag is set to "1", the reverted rotational speed from the fuel supply cut condition is set to a higher speed, and fuel injection is resumed early. If the flag F_NFCTUP is "1", the flow proceeds to step S13.

Next, when the fuel supply cut reversion flag F_NFCTUP is "0" in step S4, the engine-stop determination flag F_IDLSTP is determined in step S5. The engine-stop determination flag F_IDLSTP is a flag that is set or reset by the process to be described later, and when the flag is set to "1", engine-stop is permitted.

Next, if the engine-stop determination flag F_IDLSTP is "0", the engine-stop delay timer reset value YTENGSTP is set in the engine-stop delay timer TMENGSTP in step S6, so that the delay timer is reset. In this example, the engine-stop delay timer reset value YTENGSFP is 10 ms. Then, a binary expression "00" is set in the parameter CVTOKNO in step S7. The delay timer is used to provide a delay time to include, for example, an expected delay in oil pressure response for start clutch control during an interval between determining that the start clutch 13 has been detached and permitting the engine-stop.

Next, when the engine-stop determination flag F_IDLSTP is "1" in step S5, it is determined whether the start clutch 13 is detached according to the flag F_ISOFF in step S8. When the start clutch 13 is detached, this flag is set to "1", and when it is not detached, this flag is set to "0".

If it is determined that the start clutch 13 is detached, it is determined in step S9 whether the engine-stop delay timer TMENGSTP is "0", and if it is "0", the parameter CVTOKNO is set to a binary expression "01" in step S10. This means that engine-stop and forced-stop by the motor are permitted. Also, if it is not "0" in step S9, the flow proceeds to step S12.

On the other hand, if the start clutch 13 is not detached, the engine-stop delay timer reset value YTENGSTP (10 ms) is set in the engine-stop delay timer TMENGSTP, in step S11, so that the delay timer is reset. And, a binary expression "01" is set in the parameter CVTOKNO in step S12.

Next, if the fuel supply cut reversion flag F_NFCTUP is "1" in step S4, the engine-stop determination flag F_IDLSTP is determined in step S13. The engine-stop determination flag F_IDLSTP is a flag that is set or reset by the process to be described later, and when the flag is set to "1", engine-stop is permitted.

Next, when the engine-stop determination flag F_IDLSTP is "0", the engine-stop delay timer reset value YTENGSTP is set in the engine-stop delay timer TMENGSTP in step S18, so that the delay timer is reset. In this example, the engine-stop delay timer reset value YTENGSTP is 10 ms. Then, a binary expression "10" is set in the parameter CVTOKNO in step S19.

Next, when the engine-stop determination flag F_IDLSTP is "1" in step S13, it is determined whether the start clutch 13 is detached according to the flag F_ISOFF in step S14. When the start clutch 13 is detached, this flag is set to "1", and when it is not detached, this flag is set to "0".

If it is determined that the start clutch 13 is not detached, the engine-stop delay timer reset value YTENGSTP (10 ms) is set in the engine-stop delay timer TMENGSTP, in step S18, so that the delay timer is reset. And, a binary expression "10" is set in the parameter CVTOKNO in step S19.

On the other hand, if the start clutch 13 is detached, it is determined in step S15 whether the engine-stop delay timer TMENGSTP is "0", and if it is not "0", the flow proceeds to step S19, and the parameter CVTOKNO is set to a binary expression "10".

Next, when the engine-stop delay timer TMENGSTP is "0" in step S15, the flow proceeds to step S16, and here, it is determined whether the vehicle velocity VLVH is "0". If the determination is that the vehicle velocity VLVH is "0", the parameter CVTOKNO is set to a binary expression "11" in step S17, and if it is not "0", the parameter CVTOKNO is set to a binary expression "10" in step S19. This determination is performed because, in step S4, the flag F_NFCTUP becomes "1" when the vehicle is rapidly decelerating so that engine-stop is permitted when the vehicle velocity VLVH is virtually "0". Therefore, the purpose is to determine whether the vehicle velocity VLVH is "0". And, although it is determined whether the vehicle velocity is "0" in step S16, it is permissible to program the flow so that the flow proceeds to step S17 when the vehicle velocity can be regarded to be virtually "0", i.e., at or below 1 km/h, for example.

Accordingly, when the engine-stop conditions are not totally satisfied and when the vehicle is in a ready-to-start condition, the flow proceeds to step S7, and a flag is set in the parameter CVTOKNO so that the reverted rotational speed from the fuel supply cut condition is unchanged and engine-stop is not permitted. Also, if the engine-stop is to be carried out while continuing the fuel supply cut condition, the flow proceeds to step S10, and a flag is set in the parameter CVTOKNO so that engine-stop is permitted without changing the reverted rotational speed from the fuel supply cut condition. Also, when engine-stop is to be carried out while continuing the fuel supply cut condition but the start clutch is not detached, the flow proceeds to step S12, and a flag is set in the parameter CVTOKNO so that engine-stop is permitted without changing the reverted rotational speed from the fuel supply cut condition. Also, when the engine-stop cannot be performed because the vehicle is stopped before the reduction ratio returns to the restart-enabling reduction ratio of CVT 3, the flow proceeds to step S19, and a flag is set in the parameter CVTOKNO so that the reverted rotational speed from the fuel supply cut condition is increased in order to revert from the fuel supply cut condition and engine-stop is not permitted. Further, after passing the state in step S19, and if the reduction ratio of CVT 3 returns to the restart-enabling reduction ratio and the conditions for performing engine-stop are all ready, the flow proceeds to step S17, and a flag is set in the parameter CVTOKNO so that engine-stop is permitted without changing reverted rotational speed from the fuel supply cut condition.

The parameter CVTOKNO set in the above process is sent to the drive force controller 5, and engine 1 is controlled according to the input information. Also, the process shown in FIG. 2 is repeated at constant regular time intervals, and, each time, the values of the parameter CVTOKNO are renewed according to the values of each flag.

Figure 3:
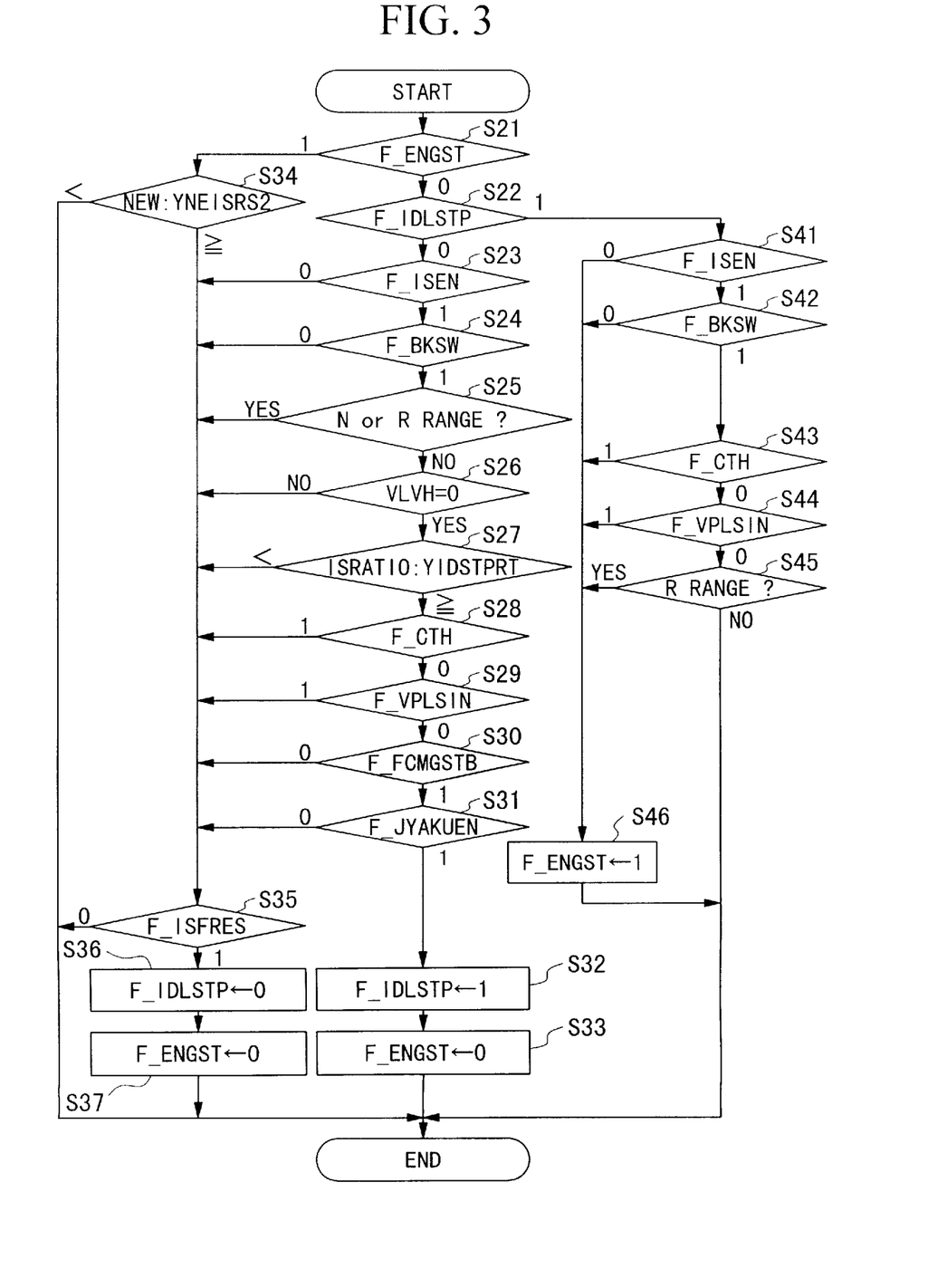
FIG. 3 is a flowchart for the process of setting or resetting the engine-stop determination flag shown in FIG. 2.

Next, the following explanation relates to the process described above of setting the values in the engine-start determination flag F_ENGST and the engine-stop determination flag F_IDLSTP. FIG. 3 shows a flowchart for the process of setting the value in the engine-start determination flag F_ENGST and the engine-stop determination flag F_IDLSTP in the transmission controller 6. The transmission controller 6 repeats the process shown in FIG. 3 at constant regular time intervals. The time interval for execution is determined in accordance with the time duration for renewing the values of each flag and parameter shown in FIG. 3, and in this example, the time interval is given a value of 10 ms.

First, it is determined in step S21 whether the conditions for engine-start are all ready by referring to the engine-start determination flag F_ENGST selected for this processing step. If the conditions for engine-start are not all ready, "0" is set in the flag, and if the condition for engine-start are all ready, "1" is set in the flag. If the conditions for engine-start are all ready, the flow proceeds to step S34.

Next, if the conditions for engine-start are not ready, it is determined in step S22 whether the conditions for engine-stop are ready by referring to the engine-stop determination flag F_IDLSTP which is selected in this processing step. If the condition for engine-stop are not ready, "0" is set, and if the conditions for engine-stop are ready, "1" is set, and the flow proceeds to step S41.

Next, if the engine-stop determination flag F_IDLSTP is "0", it is determined in step S23 whether the oil temperature for the hydraulic oil in CVT 3 is equal to or above a specific temperature according to the flag F_ISEN. If the oil temperature is equal to or above the specific temperature, "1" is set in the flag, and if it has not reached the specific temperature, "0" is set. If the oil temperature is not at the specific temperature, the flow proceeds to step S35.

Next, if the oil temperature of the hydraulic oil in CVT 3 is equal to or above the specific temperature, it is determined in step S24 whether the brake switch 7 is ON according to the flag F_BKSW. If the brake switch 7 is ON, "1" is set in the flag, and if it is OFF, "0" is set in the flag. If the brake switch 7 is OFF, the flow proceeds to step S35.

Next, if the brake switch 7 is ON, it is determined in step S25 whether the position switch 8 is in N- or R-range. If it is in N- or R-range, the flow proceeds to step S35.

Next, if the position switch 8 is in a range other than N- or R-range, it is determined in step S26 whether the vehicle velocity VLVH is "0". If the determination for the vehicle velocity VLVH is not "0", the flow proceeds to step S35.

Next, if the vehicle velocity VLVH is "0", it is determined in step S27 whether the reduction ratio ISRATIO of CVT 3 is at a restart-enabling value. A restart-enabling reduction ratio, in this case, refers to a reduction ratio to enable sufficient acceleration to start the vehicle, and even if the vehicle is started from the current reduction ratio, the durations are shortened for insufficient lubrication of the start clutch, insufficient lateral pressure of the pulleys and complete engagement of the start clutch. The restart-enabling reduction ratio refers to a range of 2.2 to 2.45 for a CVT 3 having a range of permissible variable reduction ratios between 2.45 to 0.4. Therefore, it is determined in step S27 whether the reduction ratio ISRATIO is equal to or above the threshold reduction ratio YIDSTPRT (reduction ratio 2.2). If the determination is that the reduction ratio ISRATIO is below 2.2, the flow proceeds to step S35.

Next, if the reduction ratio of CVT 3 is at the start-enabling reduction ratio, it is determined in step S28 whether the throttle is in the fully-closed-state according to the throttle fully-closed flag F_CTH. The throttle fully closed flag F_CTH is a flag that is set by the output of a throttle opening sensor 6S, and "0" is set if it is fully closed, and "1" is set when the throttle is ON. If the determination is ON for the throttle, the flow proceeds to step S35.

Next, if the throttle is fully closed, it is determined in step S29 whether the vehicle velocity pulse has been input according to the flag F_VPLSIN. This flag is set to "1" when the vehicle velocity pulse has been input, and is set to "0" the vehicle velocity pulse has not been input. If the determination is that the vehicle velocity pulse has been input, the flow proceeds to step S35.

Next, if the vehicle velocity pulse has not been input, it is determined in step S30 whether the engine-stop preparation is complete according to the engine-stop preparation complete flag F_FCMGSTB sent from the drive force controller 5. If the preparation is not complete, the flow proceeds to step S35.

Next, if the engine-stop preparation is complete, it is determined in step S31 whether the pressure in the start clutch 13 has dropped to a level in which the start clutch 13 engages by an ineffective stroke (clutch free movement) according to the flag F_JYAKUEN. This flag is set to "1" when the pressure in the start clutch 13 drops to a level in which the start clutch 13 engages by the ineffective stroke, and is set to "0" when the pressure is high. This determination is made to check whether the pressure is low enough to eliminate thrust shock generated when the engine is stopped, because such a shock is not generated when the engine is stopped at a low pressure in the start clutch 13. If the determination is that the pressure in the start clutch 13 is high, the flow proceeds to step S35.

Next, if the pressure in the start clutch 13 is low, it means that the conditions for engine-stop are ready, so that "1" is set in the engine-stop determination flag F_IDLSTP in step S32 and, in step S33, "0" is set in the engine-start determination flag F_ENGST, and the process is finished.

Next, the following explanation relates to the process of determining whether to reset the flag F_IDLSTP and F_ENGST in steps S34 to S37 when the flag F_ENGST is "1" in step S21.

First, it is determined in step S34 whether the engine speed NEW is equal to or above the threshold value (YNEISRS2). If it is below the threshold value, this process is finished. On the other hand, if the engine speed is equal to or above the threshold value, the flow proceeds to step S35, and it is determined in step S35 whether the ineffective stroke engaging action for the start clutch 13 is complete according to the flag F_ISFRES. If the ineffective stroke engaging action for the start clutch 13 is complete, "1" is set in the flag, so that the flag F_IDLSTP and F_ENGST are both set to "0" in steps S36, 37. If the ineffective stroke engaging action is not complete, the process is finished.

Next, the following explanation relates to the process of determining whether to start the stopped engine in steps S41 to S46 when the engine-stop determination flag F_IDLSTP is "1" in step S22.

First, it is determined in step S41 whether the oil temperature of the hydraulic oil in CVT 3 is equal to or above a specific temperature according to the flag F_ISEN. If the oil temperature is equal to or above the specific temperature, "1" is set in the flag, and if it has not reached the specific temperature, "0" is set. If the oil temperature is not at the specific temperature, the flow proceeds to step S46.

Next, if the oil temperature of the hydraulic oil in CVT 3 is equal to or above the specific temperature, it is determined in step S42 whether the brake switch 7 is ON according to the flag F_BKSW. If the brake switch 7 is ON, "1" is set in the flag, and if it is OFF, "0" is set in the flag. If the brake switch 7 is OFF, the flow proceeds to step S46.

Next, if the brake switch 7 is ON, it is determined in step S43 whether the throttle is in the fully-closed-state according to the throttle fully-closed-state flag F_CTH. The throttle fully-closed-state flag F_CTH is a flag that is set by the output of a throttle opening sensor 6S, and "0" is set if it is fully closed, and "1" is set when the throttle is ON. If the determination is ON for the throttle, the flow proceeds to step S46.

Next, if the throttle is fully closed, it is determined in step S44 whether the vehicle velocity pulse has been input according to the flag F_VPLSIN. This flag is set to "1"

when the vehicle velocity pulse has been input, and is set to "0" when the vehicle velocity pulse has not been input. If the determination is that the vehicle velocity pulse has been input, the vehicle is beginning to move so that the flow proceeds to step S46.

Next, if the vehicle velocity pulse has not been input, it is determined in step S45 whether the position switch 8 is in the R-range. If the determination is that the position switch 8 is not in the R-range, the process is finished.

Next, if the position switch 8 is in the R-range, "1" is set in the engine-start determination flag F_ENGST in step S46, and the process is finished.

Accordingly, in steps S32, S36, the engine-stop determination flag F_IDLSTP is set or reset, and in steps S33, S37, S46, the engine-start determination flag F_ENGST is set or reset. Also, the process shown in FIG. 3 is repeated at constant regular intervals, and each time, the values of the engine-stop determination flag F_IDLSTP and the engine-start determination flag F_ENGST are renewed according to the values of the flags shown in FIG. 3.

Figure 4:
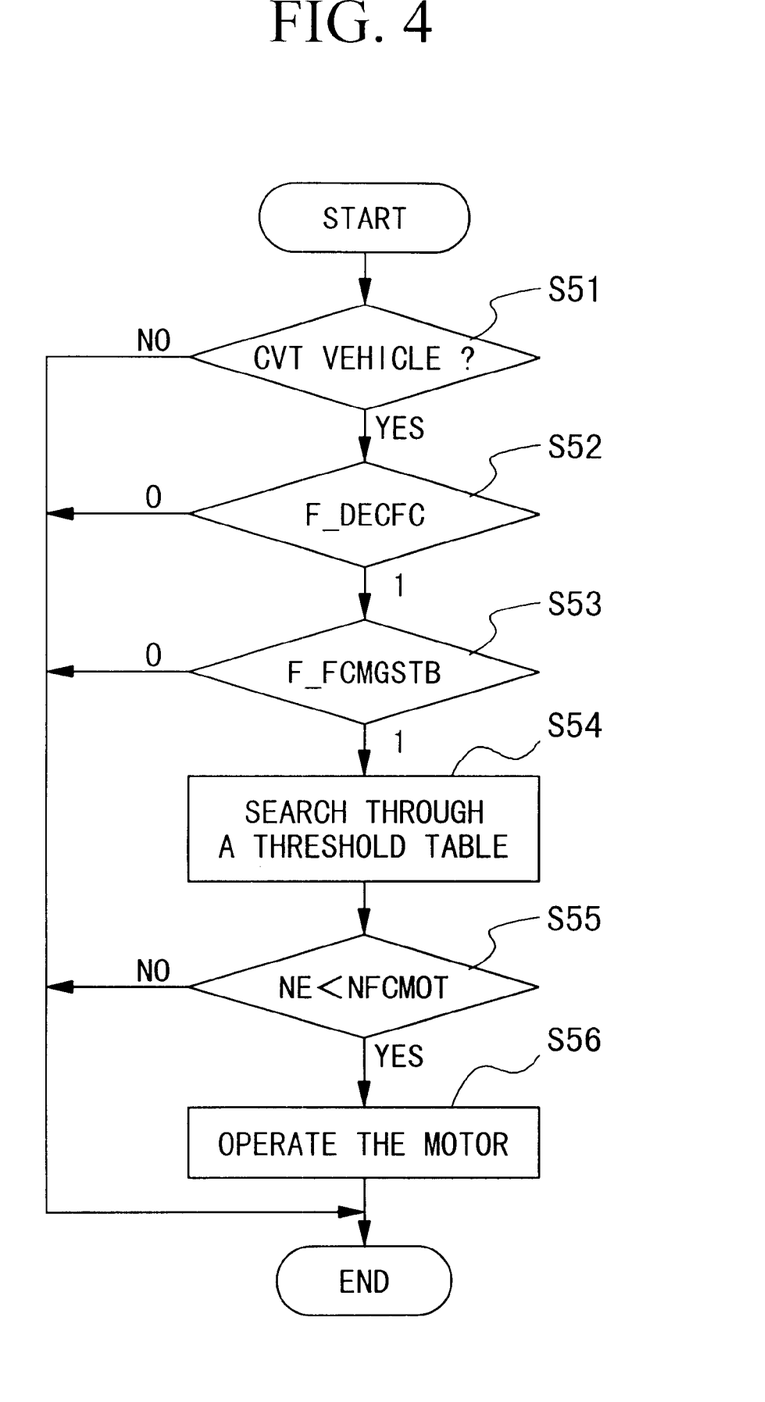
FIG. 4 is a flowchart for the process of maintaining the idling engine speed of engine 1 by using motor 2.
Figure 6:
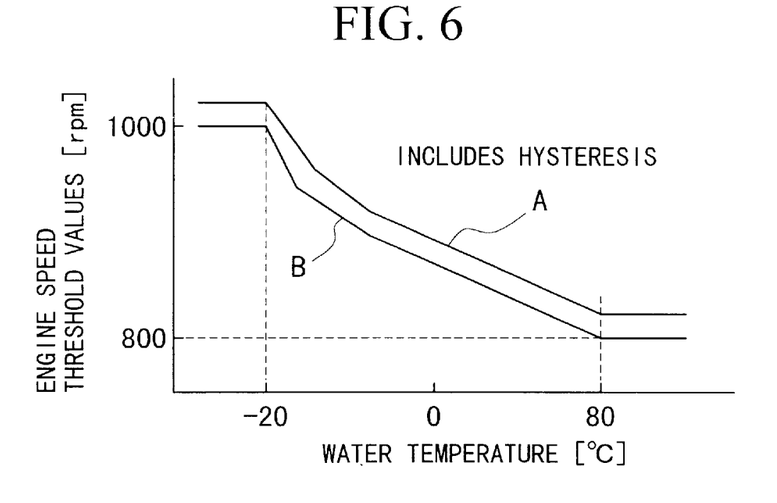
FIG. 6 is a graph to explain the structure of a table of threshold values used for reference in step S54 shown in FIG. 4.
Figure 7:
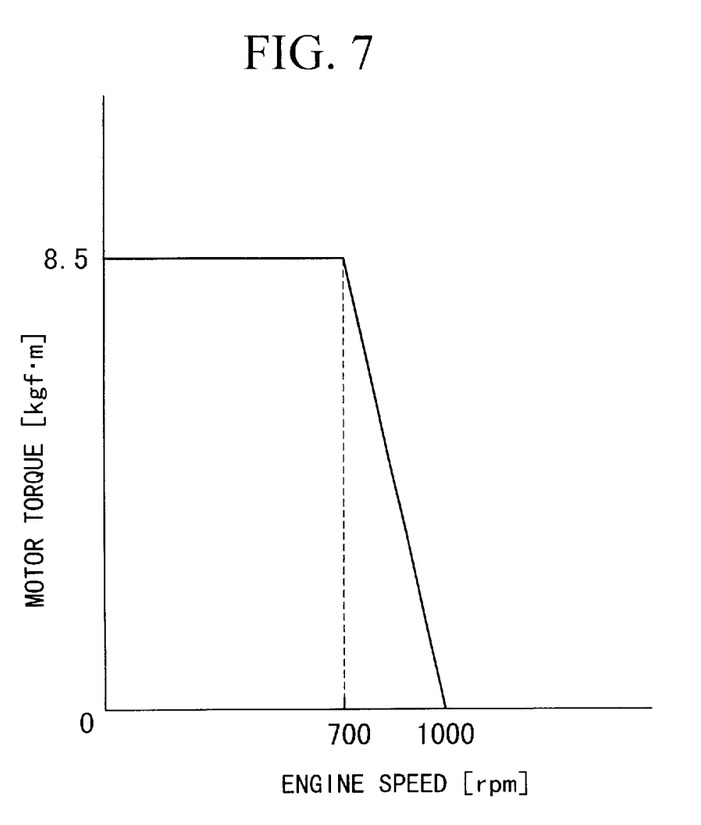
FIG. 7 is a graph for the torque generated by motor 2 to maintain the idling engine speed of engine 1.

Next, the following explanation relates to the operation described in FIGS. 4, 6 and 7 to maintain the idling state of engine 1 until the reduction ratio of CVT 3 reaches a state to enable the vehicle to start moving, by controlling the rotation of the motor 2 from the motor controller 4 and the drive force controller 5. The idling maintaining operation is activated during the deceleration event, when the fuel supply cut is executed and the reduction ratio of CVT 3 has not reached the restart-enabling reduction ratio, so that the idling of engine 1 is maintained by the motor 2. In this example, the restart-enabling reduction ratio refers to a reduction ratio to enable sufficient acceleration to start the vehicle, and even if the vehicle is started from the current reduction ratio, the durations are shortened for insufficient lubrication of the start clutch, insufficient lateral pressure of the pulleys and complete engagement of the start clutch. The restart-enabling reduction ratio refers to a range of 2.2 to 2.45 for a CVT 3 having a range of permissible variable reduction ratios between 2.45 to 0.4.

First, it is determined in step S51 whether the vehicle is a CVT-equipped vehicle. If the determination indicates that the vehicle is not equipped with CVT, the flow is finished without performing control of motor 2.

Next, it is determined in step S52 whether the fuel supply cut is executed currently according to the flag F_DECFC. The flag F_DECFC to indicate whether the fuel supply cut is being executed is set to "1" when it is executed currently, and is set to "0" when it is not executed currently. If the determination is that fuel supply cut is not being executed currently, the process is finished without controlling the motor 2.

If, on the other hand, if the fuel supply cut is being executed currently, it is determined whether engine-stop preparation is completed according to the engine-stop preparation complete flag FCMGSTB. If the determination is that engine-stop preparation is not complete (i.e., when flag FCMGSTB=0), the process is finished without controlling the motor 2.

Next, when the engine-stop preparation is complete, an engine speed threshold value table is searched, in step S54, using the output data from the water temperature sensor 5S. As shown in FIG. 6, the engine speed threshold value table is a table defining the relation between the water temperature and the engine speed, and the solid lines shown by letters A, B in FIG. 6 represent envelopes of the threshold values. The line A relates to the upper limits and the line B relates to the lower limits. Threshold values thus exhibit a hysteresis. The threshold value of the engine speed corresponding to the current water temperature can be obtained by referring to this table.

Next, the threshold value NFCMOT of the engine speed obtained in step S54 is compared against the engine speed NE obtained from the engine speed sensor 1S, in step S55. If the determination is that the engine speed NE is equal to or higher than the engine speed threshold value NFCMOT, the process is finished without controlling the motor 2.

On the other hand, if the engine speed NE is below the engine speed threshold value NFCMOT, the motor 2 is operated to assist the engine 1 in step S56. Accordingly, even under the condition of fuel supply cut, idling of engine 1 can be maintained.

Here, the process of driving the motor 2 in step S56 will be explained. FIG. 7 shows a relation between the motor torque and the engine speed of engine 1 when the motor 2 is operated in step S56. Motor 2 is controlled by varying the motor torque in accordance with the engine speed of engine 1. As shown in FIG. 7, when the engine speed is 1000 rpm, motor torque is 0 kgf m, and as the engine speed decreases, motor 2 is controlled so as to increase the motor torque gradually so that motor torque will be 8.5 kgf m when the engine speed reaches 700 rpm. This control action is stopped when the reduction ratio of CVT 3 returns to a start-enabling value, in other words, when the content of the parameter CVTOKNO indicates that engine-stop is permissible. The engine speed of engine 1 is maintained at 900 rpm by controlling the rotation of motor 2 in accordance with the changes in motor torque shown in FIG. 7.

Accordingly, by increasing the motor torque as the engine speed decreases, the sense of jerking generated when the motor torque is engaged is eliminated. Also, because idling state of engine 1 can be maintained while continuing the fuel supply cut condition, engine-stop can be executed while standing-by to wait for the reduction ratio of CVT 3 to reach a restart-enabling reduction ratio without wasting the fuel.

Here, the changes in the motor toque shown in FIG. 7 can be determined by determining changes in the motor torque to enable to maintain the idling engine speed of the engine, according to the idling engine speeds designed for the engine 1. The engine speed (to produce a non-zero motor torque) which triggers motor 2 is chosen so that it is higher than the idling engine speed. Also, the motor torque to produce a constant motor torque is chosen so that the idling engine speed of engine 1 can be maintained, even when the engine speed of engine 1 becomes lower than the idling engine speed of engine 1. Also, the process is designed so that the approach to the constant torque will be linear. By so doing, idling engine speed can be maintained without generating the sense of unsteadiness produced when the motor torque is engaged while fuel supply cut is being executed.

Figure 5:
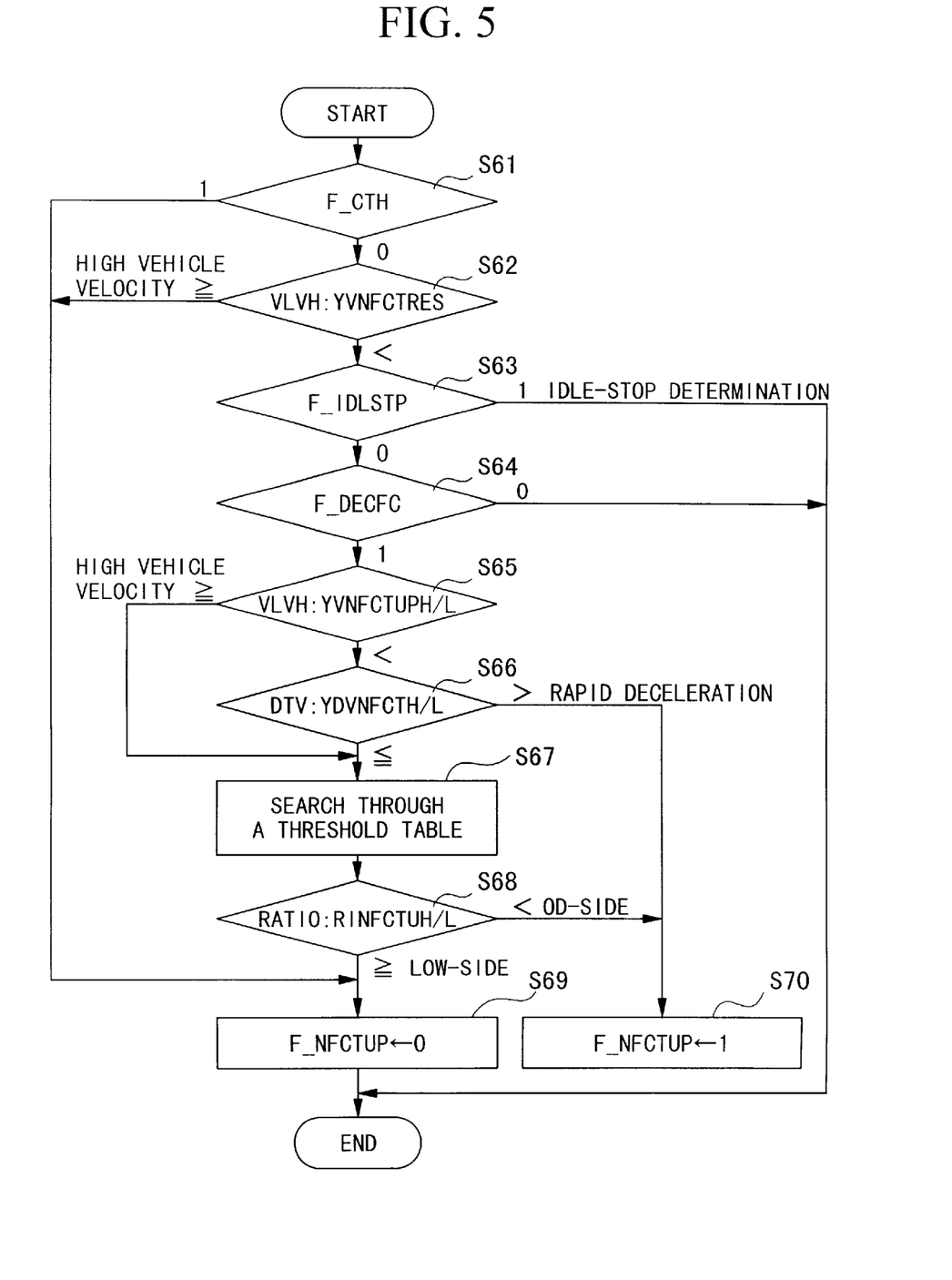
FIG. 5 is a flowchart for the process of setting or resetting the fuel supply cut reversion flag shown in FIG. 2.
Figure 8:
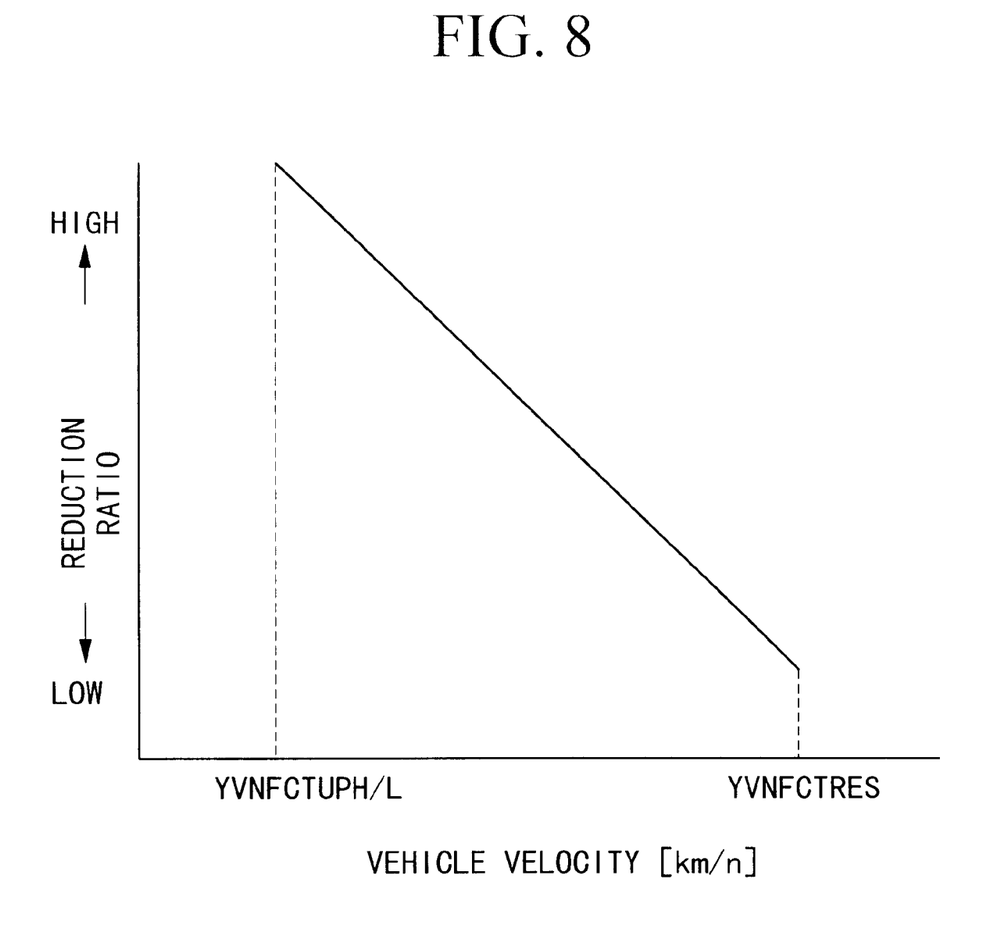
FIG. 8 is a graph to explain the structure of a table of threshold values used for reference in step S67 shown in FIG. 5.

Next, the following explanation with reference to FIGS. 5 and 8 relates to the process of delaying the execution of engine-stop until CVT 3 reaches a restart-enabling condition. FIG. 5 is a flowchart to show the process of setting the fuel supply cut reversion flag F_NFCTUP which is referred to in step S4 shown in FIG. 2. When "1" is set in the fuel supply cut reversion flag F_NFCTUP, engine 1 is controlled by setting the reverted engine speed (from the fuel supply cut condition in the deceleration stage) to a higher value. Here, reverting from fuel supply cut means to restart fuel injection. To set the reverted engine speed higher means that, when the fuel supply is being cut during deceleration of the vehicle, fuel supply cut condition is reverted in connection with the reduction of the vehicle velocity before the speed of engine 1 becomes too low.

Here, restart-enabling reduction ratio refers to the same restart-enabling reduction ratio described previously, and the value will be in a range of 2.2 to 2.45 in the following explanation.

The transmission controller 6 repeats the process shown in FIG. 5 at constant regular intervals. Such intervals can be determined according to the time required to renew the flags that are used in the process shown in FIG. 5. In this example, the time interval is given a value of 10 ms.

First, it is determined in step S61 whether the throttle is fully closed according to the throttle fully closed flag F_CTH. The throttle fully-closed flag F_CTH is a flag that is set by the output data of the throttle opening sensor 6S, and "0" is set for fully-closed throttle and "1" is set for throttle ON. If the determination is ON for the throttle, "0" is set in the fuel supply cut reversion flag F_NFCTUP in step S69.

When the throttle is fully closed, the vehicle velocity VLVH is compared against the fuel supply cut reversion reset vehicle velocity YVNFCTRES in step S62. If the determination indicates that the vehicle velocity VLVH is equal to or higher than the fuel supply cut reversion reset vehicle velocity YVNFCTRES, "0" is set in the fuel supply cut reversion flag F_NFCTUP in step S69. The fuel supply cut reversion reset vehicle velocity YVNFCTRES is a threshold value so that the following process will not be executed when the vehicle velocity is so high that there is no need for reverting from the fuel supply cut condition. Therefore, the fuel supply cut reversion reset vehicle velocity YVNFCTRES should set a value for the vehicle velocity such that, even though the throttle is fully closed, it is readily able to return to the restart-enabling reduction ratio before the engine stops.

If the vehicle velocity VLVH is below the fuel supply cut reversion reset vehicle velocity YVNFCTRES, it is determined in step S63 whether engine-stop is being executed currently according to the engine-stop determination flag F_IDLSTP. The engine-stop determination flag F_IDLSTP is a flag that is set or reset in the steps S32, S36 in FIG. 3, and when engine-stop is being executed the flag is set to "1", and when the engine-stop is not being executed the flag is set to "0". If the determination is that the engine-stop is being executed, the process is finished.

If engine-stop is not being executed, it is determined in step S64 whether the fuel supply cut is being executed currently according to the fuel supply cut determination flag F_DECFC. The fuel supply cut determination flag F_DECFC is set to "1" when the fuel supply cut is being executed currently, and is set to "0" when it is not being executed. If the determination is that the fuel supply cut is not being executed, the process is finished.

When the fuel supply cut is being executed currently, the current vehicle velocity VLVH is compared against the fuel supply cut reversion vehicle velocity YVNFCTUPH/L in step S65. The fuel supply cut reversion vehicle velocity YVNFCTUPH/L is a threshold value having a hysteresis, and this vehicle velocity represents a speed that causes the vehicle to stop, when the vehicle is decelerated rapidly from a certain speed, before the reduction ratio of CVT 3 is returned to the start-enabling reduction ratio. In this example, the fuel supply cut reversion vehicle velocity YVNFCTUPH/L is given a value of 20 km/h. If the determination is that the vehicle velocity VLVH is equal to or higher than the fuel supply cut reversion vehicle velocity YVNFCTUPH/L, the flow proceeds to step S67.

On the other hand, if the vehicle velocity VLVH is below the fuel supply cut reversion vehicle velocity YVNFCTUPH/L, the deceleration DTV of the vehicle is compared against the fuel supply cut reversion deceleration YDVNFCTH/L in step S66. The deceleration DTV is a negative acceleration computed from the changes in output of vehicle velocity sensor 4S. That is, a high value of deceleration DTV means that the vehicle is rapidly slowing down by application of braking, for example. Also, the fuel supply cut reversion deceleration YDVNFCTH/L is a value determined by the ability of CVT 3 to alter the reduction ratio, so that if the reduction ratio of CVT shows a high rate of change, the fuel supply cut reversion deceleration YDVNFCTH/L will be a high value (deceleration is increased). In this example, the fuel supply cut reversion deceleration YDVNFCTH/L is activated at a value of −0.5 G.

If the determination shows that the deceleration DTV of the vehicle is higher than the fuel supply cut reversion deceleration YDVNFCTH/L, i.e., rapid deceleration, the fuel supply cut reversion flag F_NFCTUP is set to "1" in step S70. By so doing, the vehicle transfers early from a state of fuel supply cut during the deceleration event to a state of fuel injection.

Next, when the deceleration DTV of the vehicle is not rapid, the threshold value of the fuel supply cut reversion reduction ratio is obtained in step S67 by searching in a threshold table for a value to correspond to the vehicle velocity VLVH. As shown in FIG. 8, values of the predetermined fuel supply cut reversion reduction ratio RTNFCTUH/L are defined in the threshold table to be used for those vehicle velocities that are equal to or above the fuel supply cut reversion vehicle velocity YVNFCTUPH/L but equal to or below the fuel supply cut reversion reset vehicle velocity YVNFCTRES. The fuel supply cut reversion reduction ratio RTNFCTUH/L defines those reduction ratios of CVT 3, for each current vehicle velocity, that are highly likely to be unable to return to the restart-enabling reduction ratio before the vehicle comes to a stop, when the vehicle is decelerated from those velocities.

Next, the fuel supply cut reversion reduction ratio RTNFCTUH/L corresponding to the current vehicle velocity obtained in step S67 is compared against the current reduction ratio RATIO of CVT 3 in step S68. The reduction ratio RATIO is computed from the output of engine speed sensor 1S and the output shaft rotation sensor 3S. If the determination of comparison process shows that the reduction ratio RATIO of CVT 3 is below the fuel supply cut reversion reduction ratio RTNFCTUH/L, the fuel supply cut reversion flag F_NFCTUP is set to "1" in step S70. By so doing, vehicle transfers from a state of fuel supply cut during the deceleration stage to a state of fuel injection.

On the other hand, if the reduction ratio RATIO of CVT 3 is equal to or higher than the fuel supply cut reversion reduction ratio RTNFCTUH/L, the fuel supply cut reversion flag F_NFCTUP is set to "0" in step S69.

Accordingly, depending of the vehicle velocity, deceleration and reduction ratio, fuel supply cut during deceleration is reverted so that it is possible to return the reduction ratio of CVT 3 to restart-enabling reduction ratio before the engine-stop is executed.

As explained above, because the process is designed so that engine-stop is executed by waiting until the CVT reaches the start-enabling reduction ratio, and therefore, when the vehicle is restarted after an engine-stop event, suitable acceleration can be obtained because the vehicle is not permitted start while the reduction ratio is low. Further, because the reduction ratio has already been returned to the start-enabling reduction ratio when the vehicle is restarting, the oil pressure in CVT 3 is used only for vehicle start operation so that it is possible to prevent the lack of lubrication for start clutch and slipping of the belt caused by the lack of lateral pressure.

Although the examples related to a hybrid vehicle having a motor 2 connected between the engine 1 and CVT 3, the present apparatus can also be used when fuel supply cut is executed during deceleration for a vehicle having only engine 1 and CVT 3. Further, any kind of continuously variable transmissions may be used so long as the oil pressure is derived from the output power of engine 1.

Also, in starting condition, if it is necessary for the automatic transmission to be in a condition to start moving, regardless of the reduction ratio, it is acceptable to delay engine-stop until such conditions are achieved in the transmission.

Also, it is not necessary to have three separate control units comprised by a drive force controller 5, a transmission controller 6 and a motor controller 4 shown in FIG. 1. These apparatuses may be combined in one apparatus. Also, the processes shown in FIGS. 2, 3, 4 and 5 may be carried out in separate control apparatuses, and the necessary flags may be exchanged among the control apparatuses. In other word, the processes shown in FIGS. 2, 3, 4 and 5 may be designed be operated independently, but the system should be organized so that flags and signals output from the sensors that are necessary for process control can be mutually referenced, so that the engine, motor and transmission are controlled according to output information from the respective flags and sensors.

What is claimed is:

1. An engine control apparatus for a vehicle, having a continuously variable transmission, coupled to an engine which generates a drive force, for driving wheels, so that, when said vehicle is in a stop-event, to enable stopping or restarting of operation of said engine in response to specific driving conditions, comprising:

a fuel supply cut device continuing to cut supply of fuel to said engine, when said vehicle is in a deceleration event, and for stopping operation of said engine when said vehicle is in the stop-event;

a vehicle velocity detector for detecting a traveling velocity of said vehicle; and a deceleration detector for detecting deceleration of said vehicle, wherein said fuel supply cut device reverts from a fuel supply cut condition when the traveling velocity of said vehicle detected by said vehicle velocity detector is lower than a predetermined velocity and a deceleration detected by said deceleration detector is higher than a predetermined deceleration, and cuts supply of fuel to stop the operation of said engine, when said vehicle reaches a restart-enabling condition after said vehicle is in the stop-event.

2. An engine control apparatus for a vehicle, having a continuously variable transmission, coupled to an engine which generates a drive force, for driving wheels, so that, when said vehicle is in a stop-event, to enable stopping or restarting of operation of said engine in response to specific driving conditions, comprising:

a fuel supply cut device continuing to cut supply of fuel to said engine, when said vehicle is in a deceleration event, and for stopping operation of said engine, when said vehicle is in the stop-event;

a vehicle velocity detector for detecting a traveling velocity of said vehicle; and a reduction ratio detector for detecting reduction ratio of said continuously variable transmission, wherein said fuel supply cut device reverts from a fuel supply cut condition only during an interval in which a reduction ratio detected by said reduction ratio detector is lower than a predetermined reduction ratio predetermined in accordance with a traveling velocity detected by said vehicle velocity detector, and cuts the supply of the fuel to stop the operation of said engine, when said vehicle reaches a restart-enabling condition after said vehicle is in the stop-event.

* * * * *